July 19, 1955  F. MAGIDSON  2,713,399
SPRING MOTOR

Filed April 29, 1953  2 Sheets-Sheet 1

INVENTOR.
FRANK MAGIDSON
BY
Brown, Critchlow, Flick & Peckham
HIS ATTORNEYS

July 19, 1955  F. MAGIDSON  2,713,399
SPRING MOTOR
Filed April 29, 1953  2 Sheets-Sheet 2

INVENTOR.
FRANK MAGIDSON
BY
Brown Critchlow, Hick & Peckham
HIS ATTORNEYS

United States Patent Office 2,713,399
Patented July 19, 1955

2,713,399

SPRING MOTOR

Frank Magidson, Pittsburgh, Pa., assignor to Pittsburgh Tag Company, Pittsburgh, Pa., a corporation of Pennsylvania Application April 29, 1953, Serial No. 351,931

5 Claims. (Cl. 185—38)

This invention relates to a spring motor, and more particularly to a spring motor of the escapement type for imparting an oscillating motion to various toys, such as swings, cradles, and the like.

The spring motor in accordance with this invention includes an oscillating arm for producing the desired motion in a toy, a toothed escapement wheel, and a main spring for rotating the wheel in a forward direction. Such rotation is normally restrained, however, by a fixed pawl, which engages a tooth of the wheel and is held in engagement therewith by the forward pressure of the tooth. An impulse pawl is mounted on the oscillating arm and is normally disengaged from the wheel, but is adapted to engage it, and to impart a slight backward movement thereto, when the arm approaches one end of its swing. That backward movement releases the fixed pawl, and permits spring means to disengage that pawl from the wheel. The wheel is then restrained only by the oscillating arm and its associated impulse pawl, which is locked in engagement with the wheel, so that under the urging of the main spring the wheel moves the oscillating arm in the opposite direction. When that arm has moved a certain distance, spring means reengage the fixed pawl with the next tooth of the wheel, thereby releasing the impulse pawl from its engagement with the wheel. The arm completes its swing under its own inertia and the inertia of any load it carries, and the cycle is repeated until the main spring runs down.

A preferred embodiment of this invention is shown in the attached drawings, in which.

Figure 1:
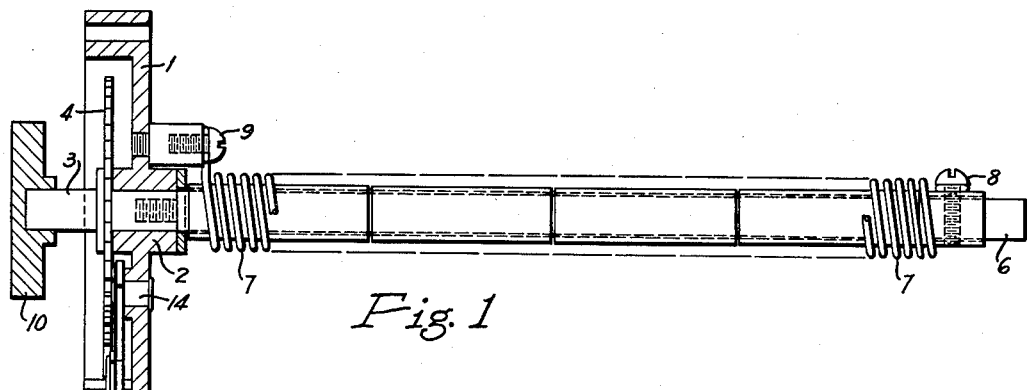
Fig. 1 is a side elevation of a section of the spring motor.
Figure 2:
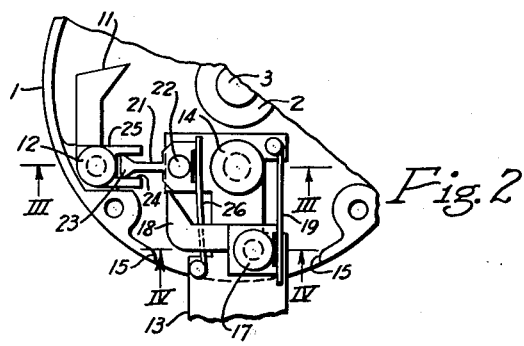
Fig. 2 is a front elevation of the motor, somewhat enlarged, with the escapement wheel removed.
Figure 3:
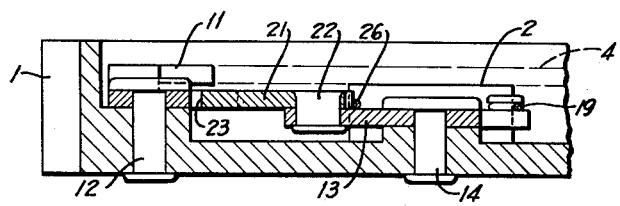
Fig. 3 is an enlarged sectional view along the line III—III in Fig. 2.
Figure 4:
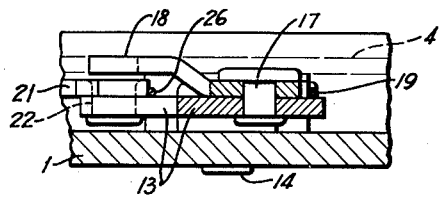
Fig. 4 is an enlarged sectional view along the line IV—IV in Fig. 2.
Figure 5:
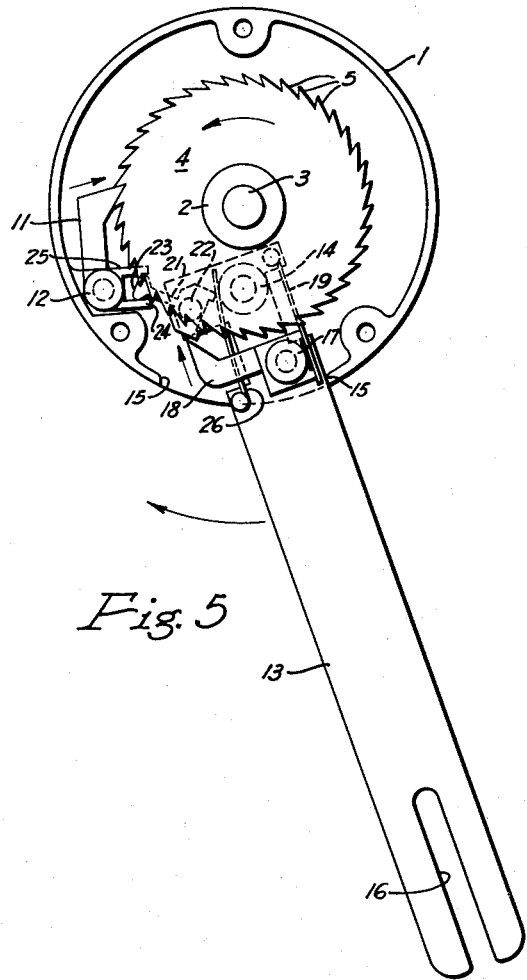

Figs. 5, 6, 7, and 8 are front elevations of the motor, in some cases having a portion of the escapement wheel cut away to show the positions of the various parts for different positions of the oscillating arm.

Referring to the drawings, a bracket 1 is provided with a central bearing 2 for a rotatable shaft 3. An escapement wheel 4, having a plurality of teeth 5, is mounted on this shaft. On the other side of the bracket, coupled to the shaft, is a rod 6, supporting a main spring 7, one end of the spring being fastened to the rod by a screw 8 and the other end being fastened to the bracket by a screw 9. A knob 10 on the end of the shaft provides means for manually winding up the spring in a clockwise direction (looking at Figs. 5–8). When so wound, the main spring urges the wheel to rotate in a counterclockwise direction, but such rotation is normally restrained by a fixed pawl 11 pivotally mounted on pin 12, which is secured to the bracket. This pawl normally engages a tooth of the wheel and is locked in engagement therewith by the forward (counterclockwise) pressure of the tooth under the urging of the main spring.

Figure 6:
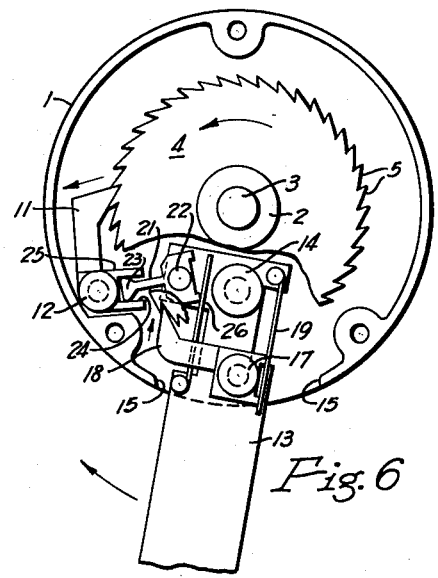
Figure 7:
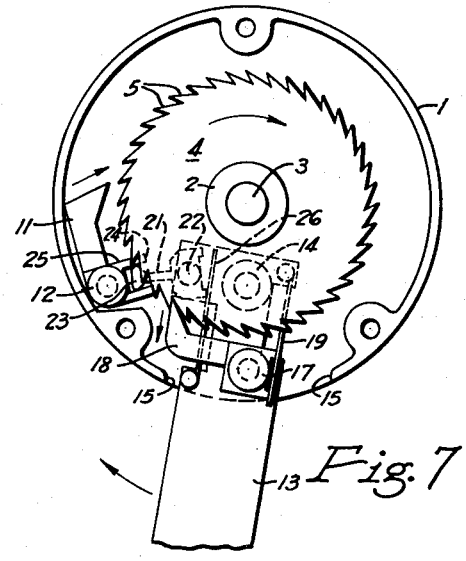
Figure 8:
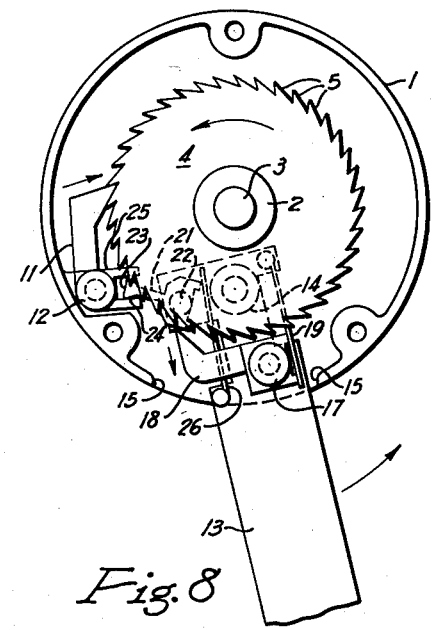

An oscillating arm 13 is pivotally mounted on the bracket eccentrically of the escapement wheel by a pin 14. This arm is free to oscillate within the limits of the flange stops 15 on the bracket and is provided with a slot 16 on its outer end, which is adapted to engage a pin on any object, such as a toy swing or cradle (not shown), for imparting an oscillating motion to that object. Pivotally mounted on the arm by a pin 17 is an impulse pawl 18, which is normally (see Fig. 5) held out of engagement with the wheel by a wire spring 19 contacting the bottom of the pawl. However, when the oscillating arm approaches the end of its swing to the left (see Fig. 6), the impulse pawl is carried by the eccentricity of the arm into engagement with a tooth of the wheel. As the arm continues to move to the left (see Fig. 7), the impulse pawl imparts a slight backward movement to the escape wheel, which is sufficient to relieve the forward pressure of the tooth engaging the fixed pawl, thereby releasing or unlocking that pawl. As soon as it is released, the fixed pawl is quickly thrown out of engagement with the wheel by spring means mounted on the oscillating arm. Those spring means include a spring lever 21, pivotally mounted on the arm by a pin 22, with its free end 23 slidably engaging a fork 24 on an angular extension 25 of the fixed pawl. The spring lever is normally held at right angles to the long axis of the oscillating arm by a wire spring 26 contacting the flat end of the lever so that when the lever is rotated in either direction, it tends to return to its normal position under the urging of that spring. Fig. 6 shows the cocked position of the spring lever when the oscillating arm is approaching the end of its swing to the left and the impulse pawl on that arm is just engaging a tooth of the wheel. Fig. 7 shows the position of the spring lever an instant later, after the fixed pawl has been released and the lever has thrown the pawl out of engagement with the wheel.

Once the fixed pawl is disengaged, the impulse pawl alone takes the pressure of the spring-loaded wheel and is locked in engagement therewith. That pressure is transmitted to the oscillating arm, which continues to swing to the left until its momentum (and that of any load on the arm) is overcome by the opposing force of the main spring, or until the arm hits the flange 15 on the bracket and its further motion to the left is stopped. The arm then swings to the right under the urging of the main spring until the spring lever 21 and its associated spring 26 rotate the fixed pawl into engagement with the next tooth on the escapement wheel. As soon as that engagement is made the fixed pawl takes the forward pressure of the wheel, thereby releasing the impulse pawl. The latter is immediately disengaged from the wheel by its spring 18 (see Fig. 8). The oscillating arm completes its swing to the right and then to the left under its own momentum to repeat the cycle of operations just described.

It will be apparent from the foregoing description that, as the oscillating arm moves to and fro, it will receive an impulse from the escapement wheel at the end of each swing to the left, and that the wheel will rotate intermittently in a counterclockwise direction, one tooth at a time, so long as the main spring supplies sufficient energy to keep the oscillating arm in motion.

It is an advantage of this invention that the fixed pawl is released from its engagement with the escapement wheel on the slightest backward movement of that wheel imparted by the impulse pawl at the end of the swing of the oscillating arm, and that, when so released, the fixed pawl is immediately disengaged from the wheel by the spring means provided. In other words, the escapement mechanism operates with a minimum amount of energy taken from the oscillating system, so that the latter will continue to oscillate for a longer time than is generally possible with other types of spring motors using an escapement action. In addition, the full force of the main spring is applied to the oscillating arm throughout a substantial portion of its swing in one direction, giving the motor greater power than other types of motors that furnish only a momentary impulse to the oscillating member.

The present invention derives a further advantage from the fact that both the impulse and fixed pawls operate independently of gravity, being brought into and out of engagement with the escapement wheel either by spring action or by the movement of the oscillating arm. As a result, the motor itself will operate in any position, and its ability to do so gives it a wider application than most conventional spring motors.

A still further advantage of the invention is its positive and reliable operation under conditions of hard usage. The escapement wheel, for example, is always in locked engagement with one of the pawls, so that the wheel cannot slip and completely unwind the main spring, a fault that is very prevalent with many spring motors.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A spring motor comprising an escapement wheel with a plurality of teeth, a main spring for rotating the wheel in a forward direction, an oscillating arm pivoted eccentrically of the wheel, a fixed pawl also pivoted eccentrically of the wheel and spaced from the arm for normally engaging the wheel to restrain its forward movement, an impulse pawl pivoted on the arm and adapted to engage the wheel and impart a slight backward movement thereto for releasing the fixed pawl when the arm approaches one end of its swing, and spring means for disengaging the fixed pawl from the wheel as soon as that pawl is released and for later re-engaging it with the wheel after the arm has begun its swing in the opposite direction under the urging of the main spring, said spring means including a spring lever pivoted on the arm with one end of the lever slidably engaging the fixed pawl for rotating that pawl and a resilient member mounted on the arm for urging the lever to occupy a predetermined angular position with respect to the arm.

2. A spring motor according to claim 1, in which the fixed pawl has an extension provided with a fork for slidably and rotatably receiving the end of the spring lever.

3. A spring motor according to claim 2, in which the spring lever has an enlarged end received within the fork of the fixed pawl.

4. A spring motor according to claim 1, in which the other end of the spring lever has a flat surface engaged by the resilient member.

5. A spring motor according to claim 1, which includes additional spring means similar to the first spring means for disengaging and re-engaging the impulse pawl from the wheel.

References Cited in the file of this patent

UNITED STATES PATENTS

| | | |
|---|---|---|
| 530,858 | Shortill | Dec. 11, 1894 |
| 579,256 | Bukolt | Mar. 23, 1897 |
| 1,342,857 | Magidson | June 8, 1920 |